March 31, 1936. M. IRELAND 2,036,049
ELECTRIC COOKING APPLIANCE
Filed March 17, 1931 4 Sheets-Sheet 1

INVENTOR
MURRAY IRELAND
ATTORNEYS

March 31, 1936.     M. IRELAND     2,036,049
ELECTRIC COOKING APPLIANCE
Filed March 17, 1931     4 Sheets-Sheet 2

INVENTOR
MURRAY IRELAND
By Paul, Paul & Moore
ATTORNEYS

March 31, 1936.  M. IRELAND  2,036,049
ELECTRIC COOKING APPLIANCE
Filed March 17, 1931  4 Sheets-Sheet 3

INVENTOR
MURRAY IRELAND
By
ATTORNEYS

March 31, 1936.　　　　　M. IRELAND　　　　　2,036,049
ELECTRIC COOKING APPLIANCE
Filed March 17, 1931　　　　4 Sheets-Sheet 4

INVENTOR
MURRAY IRELAND
ATTORNEYS

Patented Mar. 31, 1936

2,036,049

UNITED STATES PATENT OFFICE 2,036,049

ELECTRIC COOKING APPLIANCE

Murray Ireland, Minneapolis, Minn., assignor, by mesne assignments, to McGraw Electric Company, Chicago, Ill., a corporation of Delaware Application March 17, 1931, Serial No. 523,233

12 Claims. (Cl. 219—19)

This invention relates to an improved cooking appliance, and more particularly to a waffle baker including a pair of grids each provided with heating elements having means for automatically controlling the flow of current therethrough.

A further object is to provide an electric appliance including a grid provided with a heating circuit having a switch therein, and a timing mechanism adapted to open said circuit after a predetermined period; an operating member for resetting said timing mechanism; means for temporarily locking said operating member against movement, when the timing mechanism has been reset, to permit said heating circuit to initially heat said grid; and means for releasing said member when the grid has been heated to a predetermined temperature, whereby the timing mechanism may operate to open said circuit after a predetermined time interval.

A further object is to provide a waffle baker comprising a pair of grids each provided with heating elements, which elements are connected in a circuit having a switch therein operable to cut out of the circuit portions of said elements, whereby two different heats may be obtained, and a timing mechanism being provided for controlling the operation of said switch, said timing mechanism having an operating member which, when operated in one direction, functions to reset the timing mechanism and, at the same time, to close said switch, whereby the heating elements will operate at high heat, and means being provided for locking said operating member against return movement, when said timing mechanism has been reset, thereby to permit said heating elements to operate to initially heat said grids, and said timing mechanism being provided with thermostatic means for releasing said operating member, when the grids have been sufficiently heated, whereby said mechanism may operate to open said switch after a predetermined time interval, and thereby cause the heating elements to operate at low heat.

In the operation of electrical appliances of the character herein disclosed, it is usually necessary that the grids be heated to a baking temperature before depositing the batter or dough thereon, in order to prevent the latter from sticking or adhering thereto. If the grids are heated to a certain temperature before the batter is deposited thereon, the batter will not adhere to the surfaces of the grids, under ordinary conditions. Heretofore, it has been common practice, when initially heating the grids of a waffle baker, particularly those which are provided with means for automatically controlling the flow of current through the heating circuits, to reset the timing mechanism several times and cause it to go through several cycles of operation, before the baker is used to cause the grids to be heated to a baking temperature before placing the batter thereon.

It is the purpose of this invention to provide means operable in connection with an electric cooking appliance to cause the timing mechanism thereof, after being reset, to be temporarily held or locked in such position whereby the heating circuits may continue to operate under high heat, without interruption, until the grids have been initially heated to a predetermined temperature, and which means is responsive to the temperature of the grids to automatically effect the release of the timing mechanism, when the grids have been sufficiently heated, whereby the timing mechanism may operate to control the flow of current to the heating elements, after a predetermined time interval. The invention is particularly applicable to grids provided with high and low heat circuits, and includes a device which, when used in connection with such an appliance, will automatically lock the timing mechanism in reset position, during which time the high heat circuit may function to initially heat the grids, and which device will operate to release the timing mechanism when the grids have been sufficiently heated, and cause the high heat circuit to cease to function and permit the low heat circuit to function.

Features of the invention reside in the construction and arrangement of the thermostatic means for temporarily retaining the locking mechanism in reset position; in the provision of a drip ring and the particular manner in which it is demountably supported upon the baker; and in other constructional details of the apparatus.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
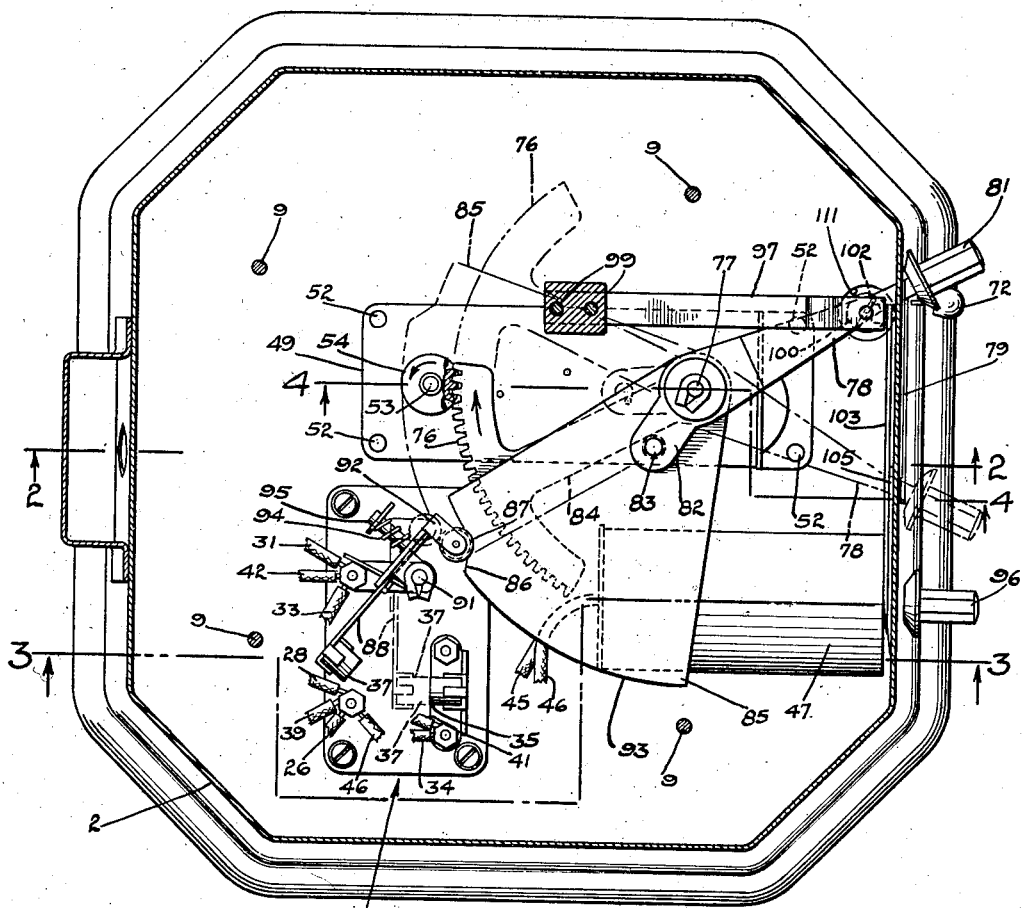
Figure 1 is a sectional plan view on the line 1—1 of Figures 2 and 3, illustrating the means for resetting or winding the timing mechanism.
Figure 2:
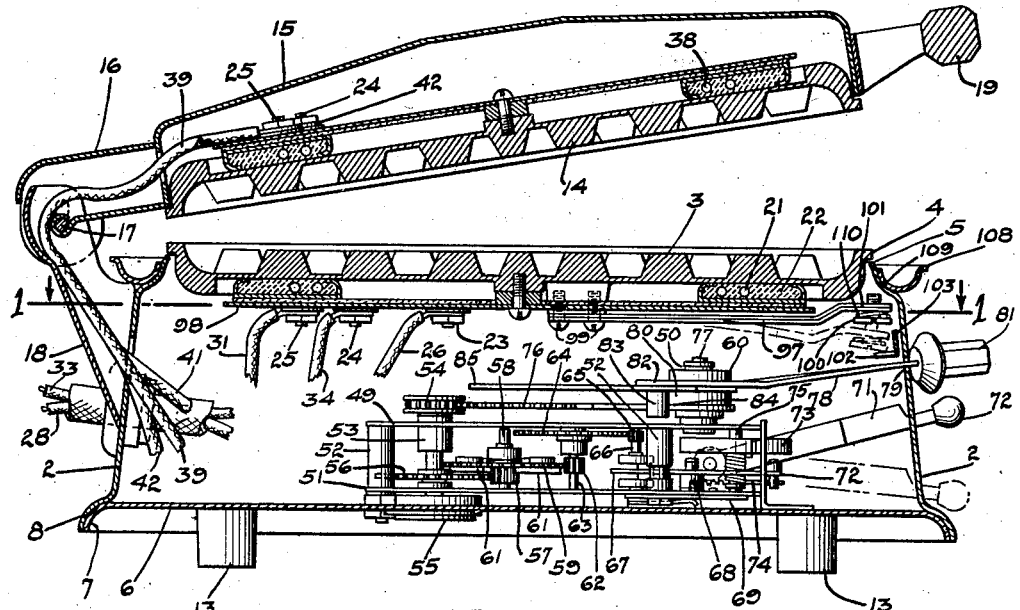
Figure 2 is a sectional elevation on the line 2—2 of Figure 1.
Figure 3:
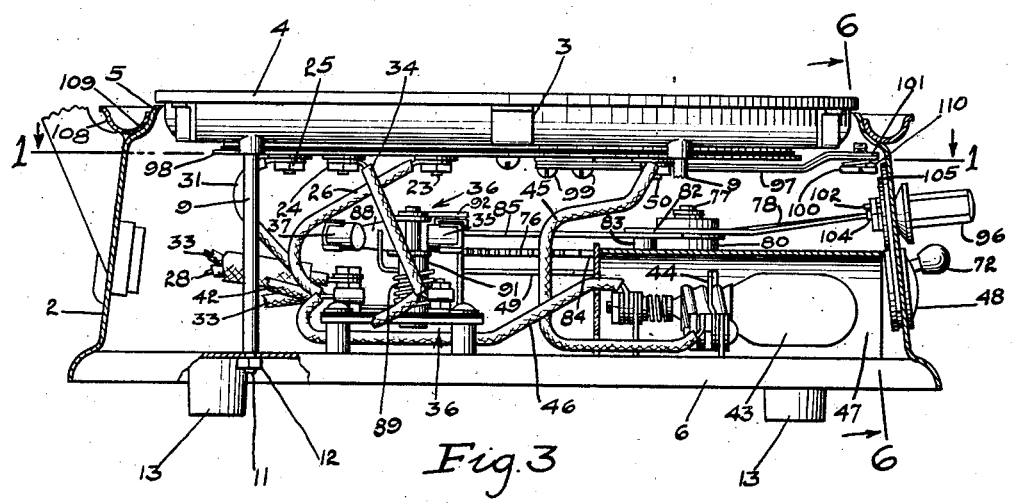
Figure 3 is a sectional elevation substantially on the line 3—3 of Figure 1, showing the illuminating means provided within the base of the baker.
Figure 8:
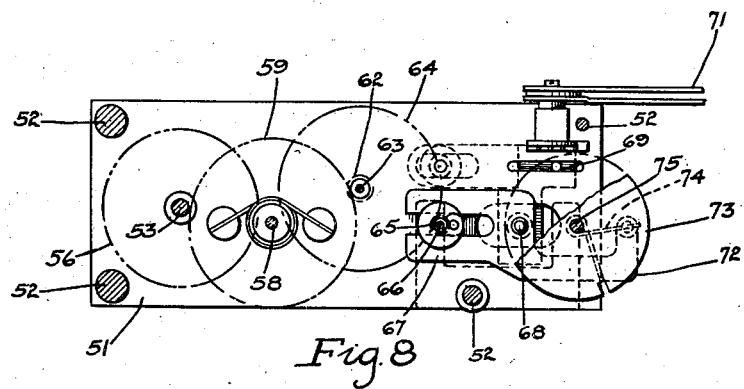
Figure 8 is a detail sectional view showing the timing mechanism only.

In the selected embodiment of the invention here shown, there is illustrated in Figures 1, 2, and 3, for purposes of disclosure, a waffle baker comprising a casing 2 having a grid 3 demountably supported in the upper portion thereof. This grid has an annular flange 4 adapted to be seated upon the upper marginal edge 5 of the casing, as best shown in Figures 2 and 3. A plate 6 provides a bottom for the casing 2 and has a rolled edge 7 adapted to be seated in a correspondingly shaped seat 8 provided in the lower portion of the casing. The grid 3 and bottom plate 6 are secured in position by means of studs 9, having their upper ends suitably secured in the grid and having lower threaded terminals passing through apertures provided in the plate 6 and adapted to receive suitable nuts 12, whereby the grid and bottom plate 9 are suitably tied together and retained in their respective seats. Suitable buttons 13 are secured to the bottom plate 6 and provide supporting feet for the apparatus.

A second grid 14 is supported in a cover 15, here shown having an extension 16 which is pivotally connected by a pin 17 to a bracket 18 provided upon the casing 2, as best shown in Figure 2. A suitable handle 19 is provided upon the cover 15, whereby it may be conveniently manipulated.

Figure 10:
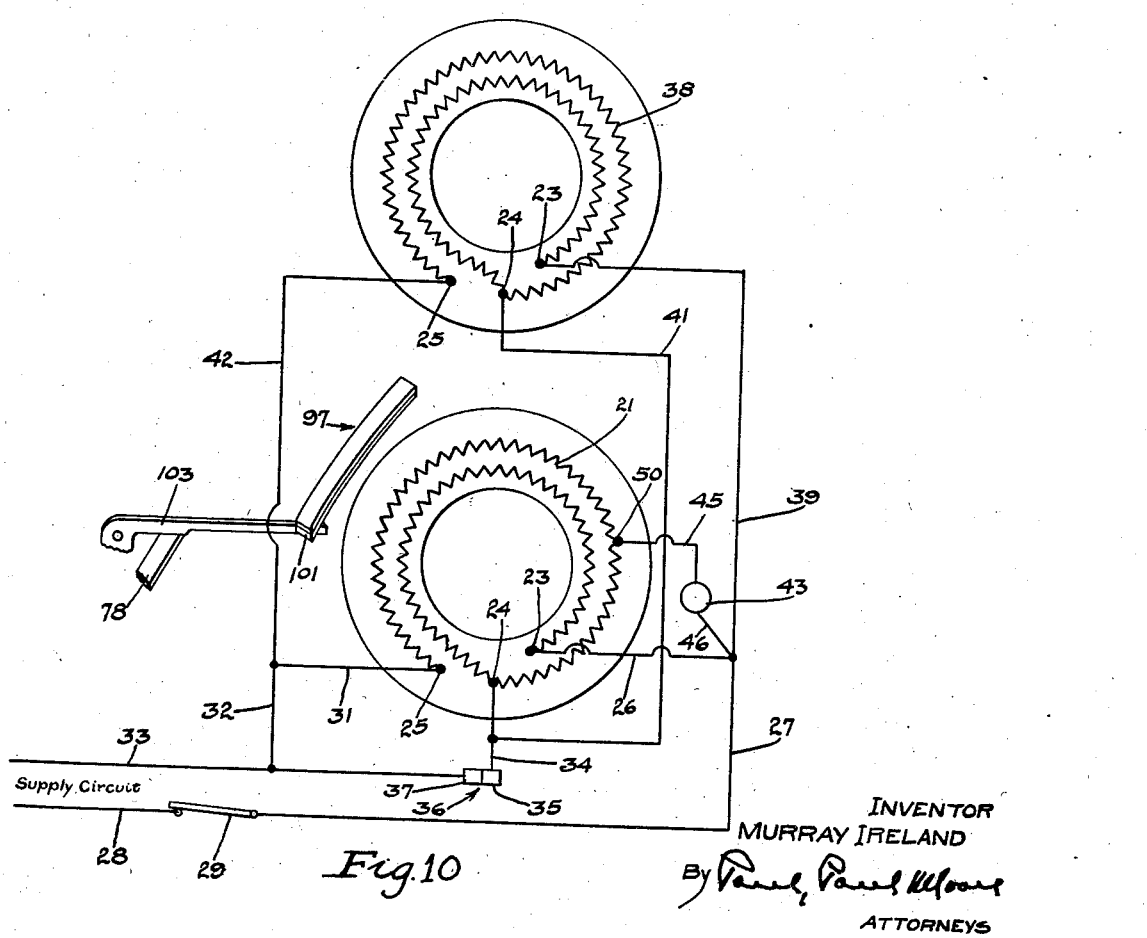
Figure 10 is a wiring diagram illustrating the connections between the heating elements of the two grids.

A suitable heating element 21 is secured to the bottom of the grid 3 and is insulated therefrom by being embedded in suitable insulating material 22. This heating element is preferably arranged in the form of a spiral, as shown in Figure 10, and is provided with three terminals, to wit: 23, 24, and 25. The terminals 23 and 25 constitute the ends of the heating element 21 and the intermediate terminal 24 is interposed in the heating element substantially midway between the ends thereof. The terminal 23 has a wire 26 connecting it with a wire 27 which is connected with the supply wire 28 by a suitable switch 29. The terminal 25 is connected by a wire 31 to a wire 32 which in turn is connected to the current supply wire 33, forming the other side of the supply circuit. The intermediate terminal 24 of the heating element has a wire 34 connecting it with a fixed contact 35 of a heat control switch 36. This heat control switch has a movable contact 37 adapted to be actuated by a suitable timing mechanism, which will subsequently be described. The heat control switch 36 provides means for cutting out of the heating circuit, a portion of the heating element, whereby high heat is obtained. When the control switch 36 is open, the resistance of the entire heating element 21 will be interposed in the heating circuit whereupon the element will operate at low heat, as is well known.

The upper grid 14 has a heating element 38 similar in construction to the element 21. This heating element, like the element 21, is provided with similar terminals 23, 24, and 25, and is adapted to be connected in parallel with the heating element 21. To thus connect the two heating elements, a wire 39 connects the terminal 23 of the element 38 with the wire 26, whereby the terminals 23 of the two elements are electrically connected together. The terminals 24 of the two coils are electrically connected by means of a wire 41 and the wire 34, and the terminals 25 are connected together by a wire 42 and wire 31. By thus electrically connecting the terminals of the two heating elements, they will always operate in parallel, and the heat control switch 36 will cause the two elements to function in like manner. In other words, when the switch 36 is open, the two heating elements will operate at low heat, and, when the switch is closed, they will both operate at high heat.

A small warning signal, in the form of a light bulb 43, is mounted in a socket 44 secured to the bottom plate 6. Wires 45 and 46 electrically connect the light bulb with the heating circuits. By reference to Figure 10, it will be noted that the wire 46 connects the light bulb with the wire 27, and the wire 45 connects the bulb with a terminal 50 interposed in the heating element 21 in such a manner that when the heating element is operating at low heat, the light bulb will burn with a dull glow, and when the element is operating at high heat, it will burn with a brilliant glow, whereby the attendant may readily note at just what heat the baker is operating. The light bulb and its supporting socket are preferably encased within a housing 47 secured to the bottom wall 6. This casing is open at one end and is alined with a small window 48 provided in the wall of the casing 2, whereby the operation of the light bulb may be noted. This window is preferably of a colored glass such as red, so as to attract attention.

The waffle iron or baker disclosed in this invention is provided with a mechanically operated timing mechanism which functions to manipulate the heat control switch 36, at the end of each baking period, whereby the heating elements will automatically be caused to operate at low heat when the timed baking period has been completed.

This timing mechanism is somewhat similar in construction to that disclosed in my pending application, Serial No. 457,893, filed May 31, 1930, and comprises a suitable frame composed of spaced-apart plates 49 and 51 secured together by suitable spacing studs 52. A main operating shaft 53 is mounted in suitable bearings provided in the plates 49 and 51. This shaft has a pinion 54 secured to the upper end thereof exteriorly of the frame plate 49. A suitable clock spring 55 is operatively connected with the operating shaft 53 by a suitable ratchet device, not shown, whereby the shaft may be rotated to wind the spring. A gear 56 is secured to the operating shaft 53 and meshes with a pinion 57 secured to a shaft 58 upon which is mounted a gear 59, which is operatively connected with the pinion 57 by means of a suitable ratchet mechanism 61, to permit relative rotation of the pinion 57 and shaft 58, when the main operating shaft is rotated to wind up the clock spring 55. The ratchet mechanism 61 permits the pinion 57 to rotate freely in one direction without imparting any movement to the gear 59, but prevents relative rotation thereof in the opposite direction, so that when the pinion 57 is driven by the clock spring, the gear 59 will rotate synchronously therewith. The gear 59 meshes with a pinion 62 secured to a shaft 63 which also carries a gear 64 which meshes with a pinion 65 provided upon a crank shaft 66 having one end of a pitman 67 engaged therewith.

The pitman 67 is supported upon a shaft 68 connected by a plate 69 adjustably supported upon the lower plate 51 and movable thereon by means of a regulating arm 71, which has a portion projecting through a slot in the wall of the casing 2 and provided with a suitable finger grip 72. When the regulating lever 71 is moved upwardly, the pivot 68 upon which the pitman 67 is supported, is moved away from the crank shaft, whereupon the timing mechanism will operate at a higher speed. When the regulating arm is moved downwardly, the pitman 67 is moved towards the crank shaft, and the timing mechanism will operate at a much slower rate of speed.

The means for winding the clock spring to reset the timing mechanism is best shown in Figures 1 and 2, and comprises a gear segment 76 having an arm 84, one end of which is rotatably mounted upon a sleeve 50 supported upon a stud 77 secured to the upper plate 49 of the frame of the timing mechanism. An operating lever 78 has a hub 60 which is loosely mounted upon the sleeve 50, and one end of the lever 78 projects through an elongated opening or slot 79 provided in the wall of the casing 2. The aperture in the hub 60 is slightly larger in diameter than the diameter of the sleeve 50 whereby the lever 78 may be tilted, as will subsequently be described. The lever 78 is provided with a suitable hand grip 81.

An extension 82 is provided upon the lever 78 and carries a pin 83 projecting downwardly therefrom into the path of the arm 84, which supports the gear segment 76. When the lever 78 is moved from the full to the dotted line position shown in Figure 1, the segment will rotate the pinion 54 in the direction indicated by the arrow, thereby causing the clock spring 55 to be wound up, and thus conditioning the clock mechanism for operation.

Figure 4:
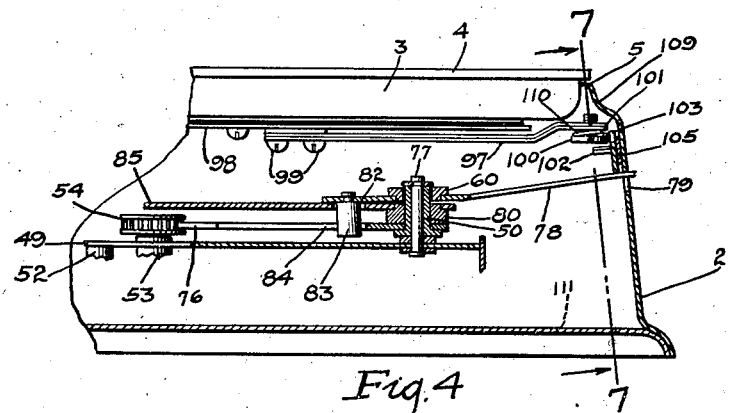
Figure 4 is a detail sectional view on the line 4—4 of Figure 1, showing the thermo-element in normal operative position, as when cold.
Figure 5:
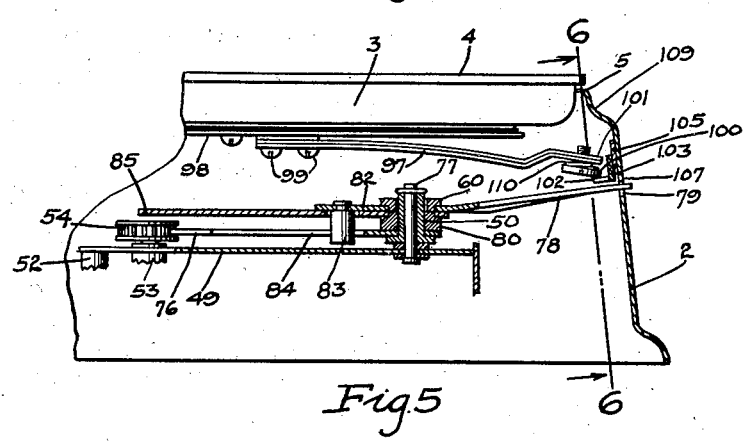
Figure 5 is a similar view showing the thermo-element warped to release the operating member of the timing mechanism.

Means are associated with the operating lever 78 whereby when said lever is moved in a direction to wind the clock spring, the heat control switch 36 will be closed so as to cause the heating elements to operate at high heat. Such means is shown in Figure 1 and comprises a sector 85 having a hub 80 which is rotatably mounted upon the stud 77. An aperture is provided in the sector 85 adapted to receive the pin 83 of the operating lever 78. The hub 80 provides means for spacing the sector from the arm 84, as shown in Figures 4 and 5. The sector is further provided with a cam face 86 adapted to engage a roller 87 provided upon a pivotally mounted switch arm 88, which furnishes the supporting means for the movable contact 37 of the heat control switch 36. When the lever 78 is in the full line position shown in Figure 1, the roller 87 will be engaged with the low portion 90 of the periphery of the sector 85, whereby the switch arm 88 will be moved to its open position by the action of a suitable tortion spring 89, coiled about a stud 91 which provides a support for the switch arm 88. When the operating lever 78 is moved in a direction towards the dotted line position shown in Figure 1, the cam face 86 will engage the roller 87 and cause the switch arm 88 to be moved to the dotted line position, shown in Figure 1, thereby causing the movable contact 37 of the control switch 36 to engage the fixed contact 35 thereof, whereupon the heating elements will operate at high heat, a portion of each element being cut out of the circuit, as hereinbefore described.

The roller 87 of the switch arm 88 is not mounted directly upon the arm 88, but upon a small bracket 92 having a movable connection with the arm 88, so that when the movable contact 37 engages the fixed contact 35 of the switch 36, and the roller 87 engages the high portion 93 of the sector 85, the bracket 92 will be moved with respect to the arm 88, such relative movement of the bracket 92 with respect to the switch arm 88, being exerted against the tension of a small spring 94 coiled about a post 95 secured to the switch arm 88. By thus movably connecting the bracket 92 with the switch arm 88, the switch contact 37 will be held in electrical connection with the fixed contact 35 by a yielding pressure, thereby assuring a good electrical connection between the two contacts.

A finger grip or rest 96 is secured to the wall of the casing 2 in horizontal alinement with the movable grip 81, for the convenience of the operator in manipulating the lever 78. The lever 78 is returned to its normal position by traveling movement of the gear segment 76 as a result of the arm 84 thereof engaging the stud 83. The gear segment is operated by the pinion 54 driven by the clock spring. The operation of this mechanism will be readily understood by reference to Figure 1.

When a waffle baker or iron is initially started and the grids are cold, it is common practice to heat the grids to a baking temperature before depositing the batter or dough between them, in order to prevent the batter from sticking or adhering thereto. If the grids are not sufficiently heated before the baking operation is started, the batter will tend to adhere thereto, and thus impair the operation of baking. As hereinbefore stated, to thus initially heat the grids of an ordinary waffle baker before the baking operation is started, it has heretofore been common practice, particularly in time controlled devices of the character herein disclosed, to manually operate the control lever several times and cause the apparatus to go through several cycles of operation before the baking operation is started. Such manual manipulation of the control lever to effect the initial heating of the grids, requires time and the constant attention of an attendant and is therefore not desirable.

An important feature of this invention resides in the provision of means operating in connection with the control lever 78, whereby said lever may be locked in the dotted line position shown in Figure 1, and temporarily retained in such position until the grids have been heated to a predetermined temperature, whereupon the lever is automatically released and permitted to start its timed travel towards the full line position shown in Figure 1.

To thus temporarily retain the control lever 78 in the dotted line position, shown in Figure 1, and thereby cause the heating elements to operate at high heat without interruption, a thermo-element 97, of a suitable bi-metal, is mounted adjacent to the lower grid 3 in a position to be influenced by the heat generated by the lower heating element 21. The thermo-element 97 is shown secured to a metallic plate 98 by suitable screws 99. The plate 98 is suitably secured to the bottom of the grid 3 in insulated relation with respect thereto.

Figures 6, 7:
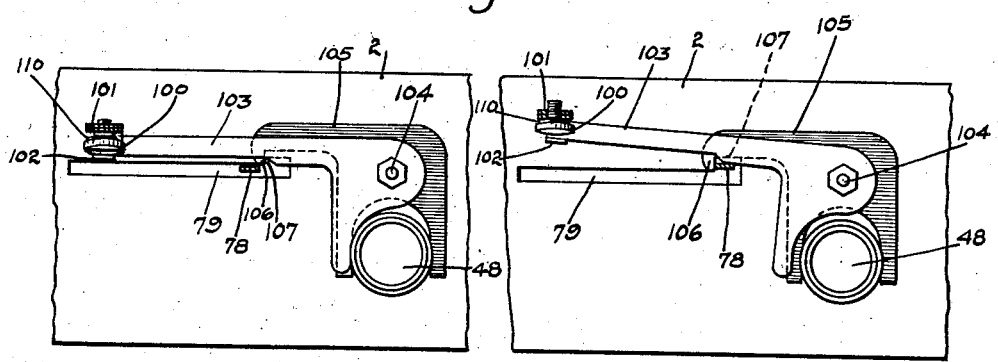
Figure 6 is a detail sectional view on the line 6—6 of Figure 5, showing the means with which the operating lever of the timing mechanism is engaged when the lever is locked against movement and when the thermo-element is in its normal position.
Figure 7 is a similar view on the line 7—7 of Figure 4, showing the operating lever released from the locking means, resulting from the warping of the thermo-element.

The end portion 101 of the thermo-element 97 is shown provided with a screw 100 adapted to engage a detent 102 provided upon one end of an arm 103 pivotally supported upon a stud 104 secured to the wall of the casing 2. A suitable spring washer 110 is mounted upon the screw 100 to retain it in adjusted positions. An aperture 111 is provided in the bottom plate 6 through which a screw driver or other instrument may be inserted to relatively adjust the position of the screw 100 in the thermo-element 97. A locking member 105 is also supported upon the stud 104 and has a hook 106 positioned to engage the operating lever 78 and retain it in the dotted line position shown in Figure 1, when the lever is moved upwardly into a notch 107 provided at the end of the slot 79. Because of the hub 60 of the operating lever 78 being loosely engaged with the sleeve 50, the lever 78 may be tilted in a vertical plane to move it into the notch 107 provided at the end of the slot 79, as shown in Figures 4 and 7. When the grids are cold and the operating lever 78 is initially moved into the dotted line position shown in Figure 1, and tilted upwardly into the notch 107, it will engage the hook 106 of the locking member which will prevent its return to the full line position, shown in Figure 1. Upward movement of the operating lever into the notch 107 will also move the arm 103 upwardly from the position shown in Figure 6 to that shown in Figure 7, so that the detent 102 will be positioned in close proximity to the head of the screw 100 of the thermo-element 97, as shown in Figure 4.

As the grids become heated, the temperature thereof will affect the thermo-element 97 and cause it to warp from the position shown in Figure 4 to that shown in Figure 5, whereby the head of the screw 100 will engage the detent 102 and depress the arm 103, causing the latter to move the operating lever 78 downwardly from the position shown in Figure 7 to that shown in Figure 6, out of engagement with the hook 106 of the locking member 105, whereby the operating lever is released and may start its timed travel towards its normal position, shown in full lines in Figure 1.

By thus retaining the operating lever 78 in the dotted line position shown in Figure 1 when the waffle baker is initially started, the grids will be heated to the desired temperature, in a comparatively short period of time and without the necessity of an attendant manipulating the operating lever several times before the baking operation is started. It is also to be understood that when the operating lever is retained in the notch 107, or is traveling from the dotted to the full line position, shown in Figure 1, the pilot light 43 will burn with a brilliant glow to indicate that the baker is operating at high heat. When the operating lever reaches its normal position, shown in full lines in Figure 1, the heat control switch 36 will be opened and the pilot light will burn with a dull glow, thereby indicating that the apparatus is operating at low heat. When the timing mechanism is not functioning as when the operating lever is in its normal position, the heating elements will be operating at low heat, which will be sufficient to retain the grids at the required temperature for the baking operation. To render the entire apparatus inoperative, the switch 29 in the supply circuit may be opened, whereby the current supply to the heating elements is completely cut off. By adjusting the screw 100 in the thermo-element, the length of time in which the operating lever 78 is held in the notch 107 may be varied.

Figure 9:
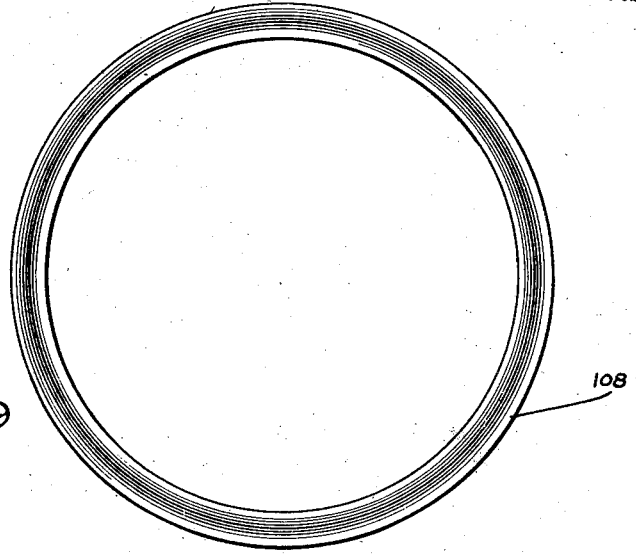
Figure 9 is a plan view showing the drip ring removed from the apparatus.

Another feature of importance resides in the provision of a drip ring 108 which is adapted to be demountably supported in a seat 109, provided at the upper portion of the casing 2, as best shown in Figures 2 and 3. This drip ring is trough-like in cross-section, and is circular in configuration, as shown in Figure 9, to conform to the outline of the lower grid 3. The grids are preferably circular in configuration, while the lower portion of the casing 2 may be shaped as shown in Figure 1. The ring 108 is demountably supported in the seat 109 and may readily be removed for cleaning purposes.

The waffle baker herein disclosed, may be initially heated in a comparatively short period of time because of the provision of the thermo-element 97 which permits the operating lever 78 to be temporarily locked in a position to cause the heating elements to operate at high heat until the grids have been heated to a predetermined temperature. After the apparatus has been initially heated and the baking operation is continued, the thermo-element will maintain the warped position shown in Figure 5, so that the operating lever cannot be moved into locking engagement with the locking member 106. The only function of the thermo-element 97 during the period when the apparatus is being continuously used for baking, is to prevent the operating lever 78 from being moved into locking engagement with the member 106. It will be noted that as long as the main switch 29 is closed, the grids will be retained at the proper temperature for baking, regardless of whether the apparatus is being used or not.

I claim as my invention:

1. In an electric appliance, high and low heat heating elements, circuits for said heating elements including a normally open control switch, a timing mechanism, an operating lever for resetting said mechanism and closing said switch, said lever being movable in substantially a horizontal plane to actuate said mechanism, a detent positioned out of the normal plane of travel of said lever, means by which the lever may be moved out of said plane of travel into engagement with said detent to thereby temporarily lock the timing mechanism against movement and a thermo-bar positioned to be influenced by temperature changes in said heating elements whereby after a time interval said thermo-bar will flex and thereby cause the release of the operating lever from said detent, whereby said timing mechanism is released and will subsequently return said switch to its normal position.

2. In an electric appliance, high and low heat heating elements, circuits for said heating elements including a control switch normally in low heat position, a timing mechanism, an operating lever for resetting said mechanism, a cam member operatively connected to said lever and adapted to move said switch into high heat position, when the lever is operated to reset the mechanism, a detent for holding the lever in reset position, and a temperature responsive device positioned to be actuated by temperature changes in said heating elements, whereby after a time interval, said device will be actuated to cause the release of the operating lever from said detent, whereby said timing mechanism is released and will subsequently cause the switch to be restored to its low heat position.

3. In an electric appliance, high and low heat heating elements, circuits for said heating elements including a control switch, a timing mechanism, an operating lever for resetting said mechanism, a switch-actuating member associated with said lever and adapted upon movement of the lever in one direction, to move said switch into high heat position, and when moved in the opposite direction, to cause said switch to move into low heat position, a detent positioned out of the normal plane of travel of said lever to thereby temporarily interrupt the timing mechanism, a pivoted member engaged with said lever, when the latter is in reset position, and a temperature responsive device positioned to be actuated by temperature changes in said heating elements, whereby after a time interval, said device will be actuated to thereby cause the release of said operating lever, whereby the timing mechanism will commence its timed return travel.

4. In an electric appliance, a heating element, a circuit therefor including a normally open control switch, a timing mechanism comprising a pinion, a gear segment engaged with said pinion, an operating lever, having a predetermined normal position, operatively associated with said gear segment and adapted, upon movement in one direction, to operate said segment and thereby reset the timing mechanism, a cam member operatively engaged with said lever and adapted to close said switch when the lever is operated in one direction, means for locking the lever in reset position comprising a pivoted arm engaging said lever, and a thermo-bar positioned adjacent to said arm and adapted to warp, when the temperature of said heating elements rises, whereby it will subsequently engage and move said arm and thereby cause the latter to move the operating lever out of engagement with said detent, whereby the timing mechanism will operate to move the switch and the lever to their respective normal positions.

5. In an electric appliance comprising a casing having an elongated opening therein, high and low heat heating elements, circuits for said heating elements including a normally open control switch, a timing mechanism, an operating lever for resetting said timing mechanism mounted for movement in said elongated opening and having a predetermined normal position, a cam member operatively connected to said lever and adapted to actuate said switch when the lever is operated, a detent at one end of said elongated opening adapted to be engaged by and lock the lever in reset position, a member pivoted within said casing and adapted to engage said lever when the latter is in locking engagement with said detent, and a thermo-bar positioned to be influenced by temperature changes in said heating elements, whereby after a time interval, said thermo-bar will engage and operate said pivoted member to thereby cause said member to move the operating lever out of engagement with said detent, whereby the timing mechanism will return the lever and switch to their normal positions.

6. In an electric appliance, high and low heat heating elements, circuits therefor including a normally open control switch comprising a movable member carrying a switch contact, a timing mechanism, an operating lever, having a predetermined normal position, for resetting said mechanism, a switch actuating member associated with said lever and comprising an arcuately formed edge portion having a cam at one end and adapted to engage said movable switch member and close the switch when the operating lever is moved in one direction, a detent for holding the lever in reset position whereby the timing mechanism is temporarily made inoperative and a thermo-bar positioned to be influenced by temperature changes in said heating elements whereby after a time interval said thermo-bar will cause the release of said lever and permit the timing mechanism to return the lever to its normal position, said arcuately formed edge portion retaining the switch in closed position until the operating lever approaches the limit of its return movement, whereupon the switch is restored to its normal open position.

7. An electric cooking appliance, comprising in combination, high and low heat heating elements, circuits for said heating elements including a control switch normally in low heat position, a timing mechanism associated with said switch and having an operating lever to reset the same, and simultaneously move the switch into high heat position, a detent for retaining the lever in reset position, a pivoted arm operatively associated with the operating lever when the latter is engaged with said detent, and a thermo-bar responsive to temperature changes in the heating elements and effective upon predetermined temperature of the heating elements to engage the arm and cause it to release the operating lever from the detent to cause operation of the timing mechanism whereby the latter returns the control switch to its normal low heat position.

8. In an apparatus of the class described, high and low heat circuits, a control switch for said circuits normally positioned for low heat, an operating lever mounted for swinging movement along a predetermined path, a cam connected to said lever and adapted to position the switch for high heat, when the lever is moved in one direction, a detent positioned out of the normal path of travel of said lever, means whereby said lever may be moved into locking engagement with said detent, means constantly tending to return the lever to its normal low heat position, and means for automatically moving said lever out of engagement with said detent, when the high heat circuit reaches a predetermined temperature, whereby the switch is returned to low heat position.

9. In an apparatus of the class described, high and low heat circuits, a control switch for said circuits normally positioned for low heat, an operating lever mounted for swinging movement along a predetermined path, a cam connected to said lever and adapted to position the switch for high heat, upon initial movement of the lever, means operatively connected to the cam for retaining the switch in high heat position, when the lever is out of its normal low heat position, a detent, means whereby the lever may be moved into locking engagement with said detent to temporarily retain the switch in high heat position, means constantly tending to return the lever to its normal low heat position, and means for moving said lever out of engagement with said detent, when the high heat circuit reaches a predetermined temperature, whereby the switch is returned to low heat position.

10. In an apparatus of the class described, high and low heat circuits, a control switch for said circuits, an operating lever mounted for swinging movement along a predetermined path, a cam connected to said lever and adapted to operate the switch, when the lever is initially moved in one direction, a segment associated with the cam and lever for retaining the switch in such operated position, when the lever is out of its normal position, a detent, means whereby the lever may be moved into locking engagement with said detent, means constantly tending to return the lever to its normal position, and a thermo-bar for automatically moving said lever out of engagement with said detent, when the high heat circuit reaches a predetermined temperature.

11. In an apparatus of the class described, high and low heat circuits, a control switch for said circuits normally positioned for low heat, a mechanism for controlling the operation of said switch comprising a timing mechanism having an operating lever having a normal inoperative position, a cam secured to said operating lever and adapted to operate the switch for high heat when the lever is moved in a direction to condition the timing mechanism for operation, a segment secured to the lever for positively holding the switch in high heat position when the lever is out of its normal position, a detent for temporarily locking said lever against movement when in high heat position, and a thermo-bar associated with said lever, responsive to temperature rise of the heat circuits, adapted to warp and cause the release of the lever when the high heat circuit reaches a predetermined temperature, whereby the timing mechanism will return the lever to normal position and restore the switch for low heat.

12. A waffle iron comprising in combination, a hollow casing, grids supported thereby, high and low heat circuits for the grids, a control switch for the circuits normally positioned for low heat, a timing mechanism for determining the length of time of high heat operation of said switch when it has been moved into such position, means for moving the switch into high heat position and for energizing the timing mechanism, said means including an operating lever having a loose pivotal mounting within the casing, an elongated slot in the casing wall through which the lever extends outwardly thereof, said slot having a lateral recess at one end, a segmental gear secured to and movable with the operating lever and operatively connected with the timing mechanism to reset the same, a sector connected to and movable with the operating lever and having a cam face effective to cause movement of the switch into high heat position in the initial part of the resetting movement of the operating lever, the loose pivotal mounting of the operating lever permitting location of the lever in the lateral recess to lock it against movement and a bimetal bar secured to one of the grids and effective upon reaching a predetermined temperature to operatively engage the operating lever and effect its release from the lateral recess to cause operation of the timing mechanism to return the operating lever to its initial position and the control switch to its normal low heat position.

MURRAY IRELAND.